(12) United States Patent
Sato et al.

(10) Patent No.: US 9,818,545 B2
(45) Date of Patent: Nov. 14, 2017

(54) CERAMIC ELECTRONIC COMPONENT

(71) Applicant: TDK Corporation, Minato-ku, Tokyo (JP)

(72) Inventors: Masayuki Sato, Tokyo (JP); Yosuke Konno, Nikaho (JP); Shunichi Yuri, Tokyo (JP); Yasuhiro Ito, Tokyo (JP); Tsutomu Odashima, Tokyo (JP); Yushi Kanou, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/392,665

(22) Filed: Dec. 28, 2016

(65) Prior Publication Data

US 2017/0186548 A1  Jun. 29, 2017

(30) Foreign Application Priority Data

Dec. 28, 2015  (JP) ................................ 2015-257374

(51) Int. Cl.
*H01G 4/10* (2006.01)
*C04B 35/468* (2006.01)
*H01G 4/30* (2006.01)
*H01G 4/12* (2006.01)

(52) U.S. Cl.
CPC ........... *H01G 4/30* (2013.01); *C04B 35/4682* (2013.01); *H01G 4/1227* (2013.01); *C04B 2235/3206* (2013.01); *C04B 2235/3208* (2013.01); *C04B 2235/3215* (2013.01); *C04B 2235/3224* (2013.01); *C04B 2235/3225* (2013.01); *C04B 2235/3236* (2013.01); *C04B 2235/3239* (2013.01); *C04B 2235/3241* (2013.01); *C04B 2235/3262* (2013.01); *C04B 2235/3418* (2013.01)

(58) Field of Classification Search
CPC .......................... H01G 4/1227; C04B 35/4682
See application file for complete search history.

(56) References Cited

U.S. PATENT DOCUMENTS

| | | | |
|---|---|---|---|
| 8,582,277 B2 * | 11/2013 | Tanaka ................. | H01G 4/1227 361/321.4 |
| 2012/0162858 A1 * | 6/2012 | Tanaka ................. | H01G 4/1227 361/321.4 |

FOREIGN PATENT DOCUMENTS

JP    2006-290675 A    10/2006

* cited by examiner

*Primary Examiner* — Karl Group
(74) *Attorney, Agent, or Firm* — Arent Fox LLP (57) ABSTRACT

A ceramic electronic component includes a dielectric layer and an electrode layer. The dielectric layer contains a plurality of ceramic particles and grain boundary phases present therebetween. A main component of the ceramic particles is barium titanate. An average thickness of the grain boundary phases is 1.0 nm or more. A thickness variation σ of the grain boundary phases is 0.1 nm or less.

8 Claims, 3 Drawing Sheets

CERAMIC ELECTRONIC COMPONENT

BACKGROUND OF THE INVENTION

1. Field of the Invention

The present invention relates to a ceramic electronic component.

2. Description of the Related Art

Ceramic electronic components are widely utilized as miniature, high performance, and high reliability electronic components, and a large number thereof are used in electrical apparatuses and electronic apparatuses. In recent years, requirements for miniaturization, higher performance, and higher reliability of ceramic electronic components have been more and more severe due to the miniaturization and increasingly high performance of electrical apparatuses and electronic apparatuses.

In response to such requirements, Patent Document 1 discloses a multilayer ceramic capacitor attempting to improve its reliability such as dielectric breakdown voltage by adopting a specific relationship between a BET value of a raw material powder of barium titanate and a BET value of a raw material powder of a dielectric ceramic composition. However, a further improvement in high-temperature load lifetime is now required. Furthermore, smaller variation of high-temperature load lifetime is also required.

Patent Document 1: JP 2006-290675 A

SUMMARY OF THE INVENTION

The present invention has been made in view of such circumstances. It is an object of the invention to provide a ceramic electronic component that achieves improvement in high-temperature load lifetime and reduction in variation of high-temperature load lifetime and has high reliability.

The present inventors have studied to overcome the above problems, and have focused on a thickness of a grain boundary phase present between a plurality of ceramic particles in a dielectric layer of a ceramic electronic component. Then, the present inventors have found out that setting an average thickness of the grain boundary phases and a thickness variation σ of the grain boundary phases within specific ranges can improve high-temperature load lifetime, reduce variation of high-temperature load lifetime, and consequently enhance reliability. The present invention has been accordingly accomplished.

The ceramic electronic component according to the present invention is specifically a ceramic electronic component including a dielectric layer and an electrode layer, wherein the dielectric layer contains a plurality of ceramic particles and grain boundary phases present therebetween, a main component of the ceramic particles is barium titanate, an average thickness of the grain boundary phases is 1.0 nm or more, and a thickness variation σ of the grain boundary phases is 0.1 nm or less.

Preferably, the dielectric layer contains barium titanate, yttrium, magnesium, chromium, vanadium, calcium, and silicon and an amount of the yttrium is 1.0 to 1.5 mol parts in terms of $Y_2O_3$, an amount of the magnesium is 1.8 to 2.5 mol parts in terms of MgO, an amount of the chromium is 0.2 to 0.7 mol parts in terms of $Cr_2O_3$, an amount of the vanadium is 0.05 to 0.2 mol parts in terms of $V_2O_5$, an amount of the calcium is 0.5 to 2.0 mol parts in terms of CaO, and an amount of the silicon is 1.65 to 3.0 mol parts in terms of $SiO_2$, provided that an amount of the barium titanate is 100 mol parts in terms of $BaTiO_3$.

Preferably, d50 of the ceramic particles is 0.47 μm or less.

Preferably, the dielectric layer contains a rare earth element "R" and silicon, and a value of an amount of the "R" in terms of $R_2O_3$ divided by an amount of the silicon in terms of $SiO_2$ is 0.40 or more and 0.79 or less.

DESCRIPTION OF THE PREFERRED EMBODIMENTS

The present invention will be described below based on an embodiment shown in the drawing.

Multilayer Ceramic Capacitor 1

Figure 1:
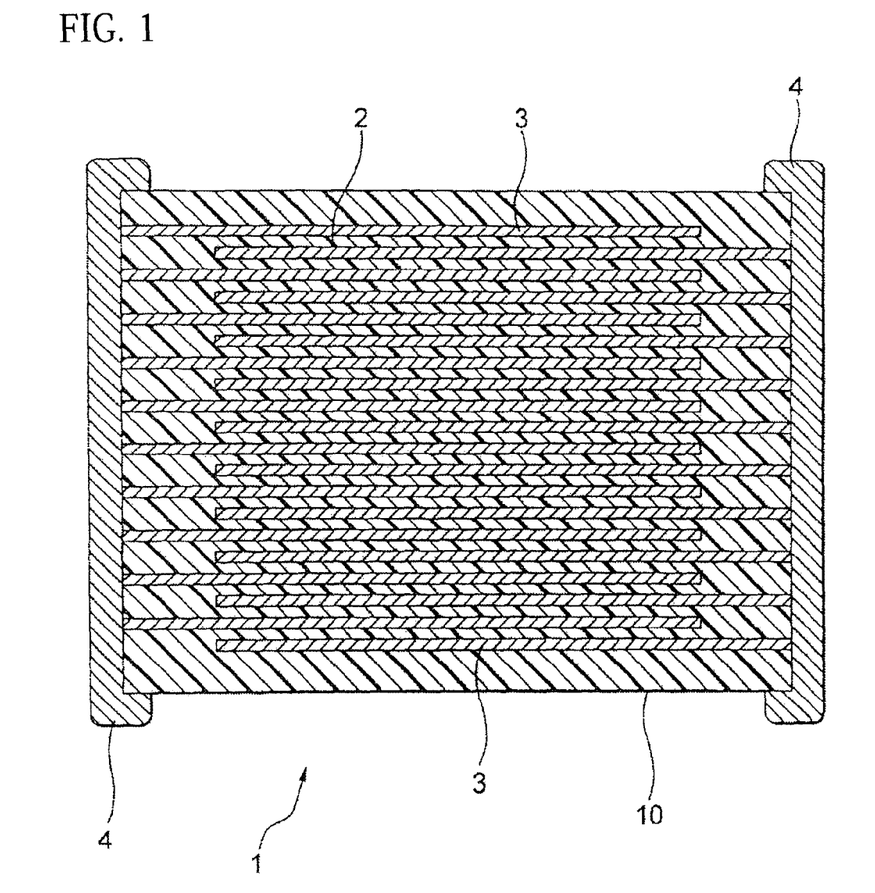
FIG. 1 is a cross-sectional view of a multilayer ceramic capacitor according to an embodiment of the present invention.

As shown in FIG. 1, a multilayer ceramic capacitor 1 according to an embodiment of the present invention includes a capacitor element body 10 having a configuration in which dielectric layers 2 and internal electrode layers 3 are alternately laminated. The internal electrode layers 3 are laminated such that each of their end surfaces is alternately exposed on surfaces of the opposing two ends of the capacitor element body 10. The pair of external electrodes 4 is formed on both ends of the capacitor element body 10, and is connected to the exposed end surfaces of the alternately disposed internal electrode layers 3 to configure a capacitor circuit.

The capacitor element body 10 has any shape, but normally has a rectangular parallelepiped shape as shown in FIG. 1. The capacitor element body 10 has any size appropriately determined according to application.

Dielectric Layer 2

Figure 2:
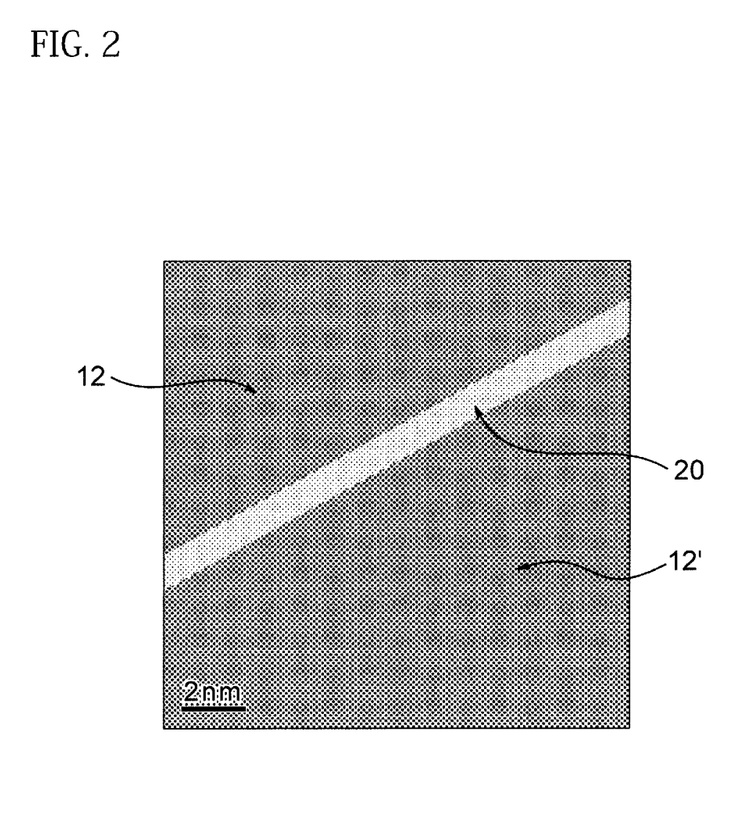
FIG. 2 is a pattern diagram showing ceramic particles and a grain boundary phase in a dielectric layer.

The dielectric layer 2 has grain boundary phases present between at least a plurality of ceramic particles and a plurality of ceramic particles. A main component of the ceramic particles is barium titanate. Incidentally, "a main component of the ceramic particles is barium titanate" means that an amount of barium titanate with respect to the entire ceramic particles is 90 wt % or more.

The barium titanate used in the present embodiment is expressed by a composition formula of $Ba_nTiO_{2+n}$. Neither "n" nor a mole ratio of Ba/Ti is limited, but barium titanate in which "n" satisfies $0.995 \le n \le 1.010$, and the mole ratio of Ba and Ti satisfies $0.995 \le Ba/Ti \le 1.010$ can be favorably used. Hereinafter, the composition formula of barium titanate will be simply described as $BaTiO_3$.

When the dielectric layer 2 of the multilayer ceramic capacitor 1 according to the present embodiment is magnified, a grain boundary phase 20 is present between a ceramic particle 12 and a ceramic particle 12', as shown in FIG. 2. The dielectric layer 2 of the multilayer ceramic capacitor 1 according to the present embodiment has the grain boundary phases 20 whose average thickness is 1.0 nm or more and thickness variation σ is 0.1 nm or less.

High-temperature load lifetime is significantly improved by setting an average thickness of the grain boundary phases 20 to 1.0 nm or more. Furthermore, variation of high-temperature load lifetime can be controlled to be small by setting a thickness variation σ of the grain boundary phases 20 to 0.1 nm or less. Incidentally, there is no upper limit for an average thickness of the grain boundary phases 20, but it is normally 1.5 nm or less and is preferably 1.2 nm or less.

A thickness of the grain boundary phase 20 is measured by any method, and can be measured by the following method, for example.

A thickness of the grain boundary phase 20 can be subjected to visual observation to be measured by observing a cross section of the dielectric layer 2 with STEM and taking a photograph used for measurement of a thickness of the grain boundary phase 20 as shown in FIG. 2. Incidentally, neither magnification of STEM nor visual field area is limited, and a visual field area of (15 to 25 nm)×(15 to 25 nm) by a magnification of 5 million to 10 million can be employed, for example.

Furthermore, an average thickness of the grain boundary phases 20 can be calculated by observing a plurality of visual fields using STEM and averaging thicknesses of the grain boundary phases 20 measured at the respective visual fields.

Furthermore, a standard deviation of the thicknesses of the plurality of grain boundary phases 20 is the thickness variation 6. The number of the visual fields for calculating the average thickness and thickness variation $\sigma$ of the grain boundary phase 20 is at least 5 or more, and is preferably 10 or more.

The average thickness and thickness variation $\sigma$ of the grain boundary phase 20 are controlled by any method, such as a method of controlling a composition of the dielectric layer 2 and a method of controlling manufacturing conditions (firing condition etc.) of the dielectric layer 2. The average thickness and thickness variation $\sigma$ of the grain boundary phase 20 can be also controlled by another method of controlling a dispersion state of additives.

High-temperature load lifetime is measured and evaluated by any method. Hereinafter, an evaluation method by Weibull distribution will be described as a method of evaluating variation of high-temperature load lifetime.

According to Weibull distribution, a failure rate $\lambda(t)$ with respect to a time "t" is represented by Formula (1) shown below, where "m" is a Weibull coefficient, and a is a scale parameter.

$$\lambda(t) = (m/\alpha^m) \times t^{m-1} \quad \text{Formula (1)}$$

When m<1 is satisfied, Formula (1) shows that the failure rate becomes smaller along with the time. When m=1 is satisfied, Formula (1) shows that the failure rate is constant with respect to the time. When m>1 is satisfied, Formula (1) shows that the failure rate becomes larger along with the time. Hereinafter, a calculation method of the Weibull coefficient "m" will be described.

A reliability (probability not to break down) R(t) of a product having the above failure rate $\lambda(t)$ is represented by Formula (2) shown below.

$$R(t) = \exp\{-(t/\alpha)^m\} \quad \text{Formula (2)}$$

Then, an unreliability (cumulative failure rate) F(t) is represented by Formula (3) shown below.

$$F(t) = 1 - R(t) = 1 - \exp\{-(t/\alpha)^m\} \quad \text{Formula (3)}$$

Now, Formula (4) shown below is obtained by transforming Formula (3).

$$\ln[\ln\{1/(1-F(t))\}] = m \ln t - m \ln \alpha \quad \text{Formula (4)}$$

Now, Formula (5) shown below is obtained in case of $y = \ln[\ln\{1/(1-F(t))\}]$ and $x = \ln t$.

$$y = mx - m \ln \alpha \quad \text{Formula (5)}$$

That is, a linear line is obtained by plotting $y = \ln[\ln\{1/(1-F(t))\}]$ with respect to $x = \ln t$, and the Weibull coefficient "m" can be calculated from a gradient of the linear line. This approach is a Weibull plotting.

In the present embodiment, the Weibull coefficient "m" can be obtained by measuring high-temperature load lifetime of a plurality of the multilayer ceramic capacitors 1 ("t" of Formulae shown above) and by subjecting the measured result to the Weibull plotting. The Weibull plotting is carried out by any method. In addition to a method of calculating "m" by plotting test results on a Weibull probability paper, a computer program for calculating the Weibull coefficient "m" by automatically performing the Weibull plotting after inputting test results has been widely used. A schematic view of the Weibull plotting is exemplified in FIG. 3.

In case of m>1, the larger the Weibull coefficient "m" is, the more rapidly the unreliability (cumulative failure rate) F(t) increases near a time "t". That is, the larger the Weibull coefficient "m" is, the smaller variation of a time to breakdown of each product is.

Figure 3:
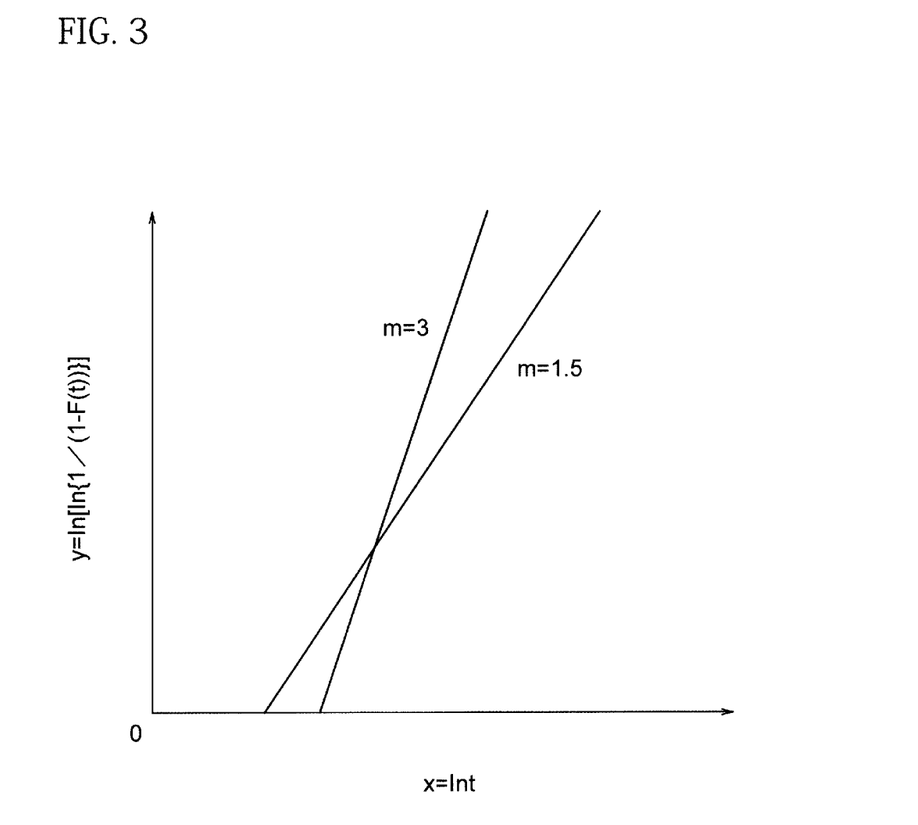
FIG. 3 is a schematic view of Weibull plotting.

In FIG. 3, F(t) increases rapidly near a time (t) in case of m=3 compared with case of m=1.5. That is, when "m" is large, many products break down at the same time near a time "t", variation of a time to breakdown of each product is small. Incidentally, in the Weibull plotting, the farther a linear line moves to the right, the longer a time to breakdown of each product becomes.

When applying to the multilayer ceramic capacitor 1 according to the present embodiment, the larger the Weibull coefficient "m" is, the smaller variation of high-temperature load lifetime is. The farther a linear line in FIG. 3 moves to the right, the longer an average of high-temperature load lifetime becomes.

There is no limit for component contained in the dielectric layers 2 of the multilayer ceramic capacitor 1 according to the present embodiment other than barium titanate. As component other than barium titanate, for example, a component composed of yttrium, magnesium, chromium, vanadium, calcium, and/or silicon may be contained, or a component composed of the other elements may be contained. Incidentally, component contained in the dielectric layers 2 is measured by any method, and can be measured by a X-ray diffraction device, for example.

Yttrium is contained preferably at 1.0 to 1.5 mol parts and more preferably at 1.3 to 1.5 mol parts in terms of $Y_2O_3$ with respect to 100 mol parts of barium titanate. With an amount of yttrium within the above range, it tends to become easy to control an average thickness of the grain boundary phases 20 to be large and to control a thickness variation $\sigma$ of the grain boundary phases 20 to be small. When an amount of yttrium is large, an average thickness of the grain boundary phases 20 tends to be small, and a thickness variation $\sigma$ of the grain boundary phases 20 tends to be large. The more yttrium is contained, the better electrostatic capacity temperature characteristics tend to be. Dysprosium or holmium may be contained instead of yttrium. Dysprosium is contained preferably at 1.0 to 1.5 mol parts and more preferably 1.3 to 1.5 mol parts in terms of $Dy_2O_3$ with respect to 100 mol parts of barium titanate. Holmium is contained preferably at 1.0 to 1.5 mol parts and more preferably 1.3 to 1.5 mol parts in terms of $Ho_2O_3$ with respect to 100 mol parts of barium titanate. Even in case of dysprosium and holmium, with an amount thereof within the above range, an average thickness of the grain boundary phases 20 tends to be large, and a thickness variation $\sigma$ of the grain boundary phases 20 tends to be small.

Magnesium is contained preferably at 1.8 to 2.5 mol parts and more preferably at 1.8 to 2.2 mol parts in terms of MgO with respect to 100 mol parts of barium titanate. With an amount of magnesium within the above range, it tends to become easy to control an average thickness of the grain boundary phases 20 to be large and to control a thickness variation σ of the grain boundary phases 20 to be small. The larger an amount of magnesium is, the larger an average thickness of the grain boundary phases 20 tends to be and the smaller a thickness variation σ of the grain boundary phases 20 tends to be. The more magnesium is contained, the better high-temperature load lifetime tends to be. The less magnesium is contained, the better relative permittivity tends to be.

Chromium is contained preferably at 0.2 to 0.7 mol parts and more preferably at 0.2 to 0.4 mol parts in terms of $Cr_2O_3$ with respect to 100 mol parts of barium titanate. With an amount of chromium within the above range, it tends to become easy to control an average thickness of the grain boundary phases 20 to be large and to control a thickness variation σ of the grain boundary phases 20 to be small. The larger an amount of chromium is, the larger an average thickness of the grain boundary phases 20 tends to be and the smaller a thickness variation σ of the grain boundary phases 20 tends to be. The more chromium is contained, the better high-temperature load lifetime tends to be. The less chromium is contained, the better relative permittivity and electrostatic capacity temperature characteristics tend to be. Incidentally, manganese may be used instead of chromium. Manganese is contained preferably at 0.2 to 0.7 mol parts and more preferably at 0.2 to 0.4 mol parts in terms of MnO with respect to 100 mol parts of barium titanate. Even in case of manganese, with an amount thereof within the above range, an average thickness of the grain boundary phases 20 tends to be large, and a thickness variation σ of the grain boundary phases 20 tends to be small.

Vanadium is contained preferably at 0.05 to 0.2 mol parts and more preferably at 0.05 to 0.10 mol parts in terms of $V_2O_5$ with respect to 100 mol parts of barium titanate. With an amount of vanadium within the above range, it tends to become easy to control an average thickness of the grain boundary phases 20 to be large and to control a thickness variation σ of the grain boundary phases 20 to be small. The larger an amount of vanadium is, the larger an average thickness of the grain boundary phases 20 tends to be and the larger a thickness variation σ of the grain boundary phases 20 tends to be. The larger an amount of vanadium is, the better high-temperature load lifetime and electrostatic capacity temperature characteristics tend to be. The smaller an amount of vanadium is, the better relative permittivity tends to be.

Calcium is contained preferably at 0.5 to 2.0 mol parts and more preferably at 0.5 to 1.5 mol parts in terms of CaO with respect to 100 mol parts of barium titanate. With an amount of calcium within the above range, it tends to become easy to control an average thickness of the grain boundary phases 20 to be large and to control a thickness variation σ of the grain boundary phases 20 to be small. The larger an amount of calcium is, the larger an average thickness of the grain boundary phases 20 tends to be and the larger a thickness variation σ of the grain boundary phases 20 tends to be. The more calcium is contained, the better high-temperature load lifetime tends to be. The less calcium is contained, the better electrostatic capacity temperature characteristics tend to be.

Silicon is contained preferably at 1.65 to 3.0 mol parts and more preferably at 1.7 to 2.5 mol parts in terms of $SiO_2$ with respect to 100 mol parts of barium titanate. With an amount of silicon within the above range, it tends to become easy to control an average thickness of the grain boundary phases 20 to be large and to control a thickness variation σ of the grain boundary phases 20 to be small. The larger an amount of silicon is, the larger an average thickness of the grain boundary phases 20 tends to be and the larger a thickness variation σ of the grain boundary phases 20 tends to be. The more silicon is contained, the better high-temperature load lifetime tends to be. The less silicon is contained, the better relative permittivity and electrostatic capacity temperature characteristics tend to be.

Furthermore, a grain diameter of the ceramic particles 12 and 12' is not limited, but d50 is preferably set to be 0.47 µm or less. When d50 is made small and set to be 0.47 µm or less, it tends to become easy to control an average thickness of the grain boundary phases 20 to be large and to control a thickness variation σ of the grain boundary phases 20 to be small. The larger d50 is, the smaller an average thickness of the grain boundary phases 20 tends to be and the larger a thickness variation σ of the grain boundary phases 20 tends to be. The lower limit of d50 is preferably set to be 0.26 µm or more. The larger a grain diameter of the ceramic particles 12 and 12' is, the more relative permittivity tends to improve. The smaller a grain diameter of the ceramic particles 12 and 12' is, the more electrostatic capacity temperature characteristics tend to improve. Samples whose chip side surfaces have been subjected to mirror polishing are observed by FE-SEM to obtain an image magnified by 30000 times, and a grain diameter of the ceramic particles 12 and 12' is measured from an equivalent circle diameter of particles obtained from the image. Incidentally, d50 refers to a diameter of grain size at which an integrated value is 50%.

Furthermore, in the present embodiment, a mole ratio ($R_2O_3/SiO_2$) between an amount of rare earth in terms of $R_2O_3$ and an amount of silicon in terms of $SiO_2$ is preferably set to be 0.40 or more and 0.79 or less, and is more preferably set to be 0.40 or more and 0.60 or less. When $R_2O_3/SiO_2$ is set to be 0.40 or more and 0.79 or less, an average thickness of the grain boundary phases 20 tends to be large, a thickness variation σ of the grain boundary phases 20 tends to be small, and high-temperature load lifetime, variation of high-temperature load lifetime, and electrostatic capacity temperature characteristics tend to improve. When $R_2O_3/SiO_2$ is large, an average thickness of the grain boundary phases 20 is easy to be small. When $R_2O_3/SiO_2$ is small, a thickness variation σ of the grain boundary phases 20 is easy to be large.

A thickness of the dielectric layers 2 is not limited, but is preferably 2 to 10 µm per one layer.

The number of lamination of the dielectric layers 2 is not limited, but is preferably about 300 to 400 layers. The upper limit of lamination is not limited, but is about 2000 layers, for example.

Internal Electrode Layer 3

A conductive material contained in the internal electrode layer 3 is not limited, but a comparatively low-cost base metal can be employed, as a constituent material of the dielectric layer 2 is reduction resistant. Ni or an Ni alloy is preferable as the base metal employed as the conductive material. An alloy of Ni and one kind or more selected from Mn, Cr, Co, and Al is preferable as the Ni alloy, and an Ni amount in the alloy is preferably 95 wt % or more. Incidentally, about 0.1 wt % or less of various kinds of trace components, such as P, may be contained in the Ni or Ni alloy. A thickness of the internal electrode layer 3 should be appropriately determined according to application or so, but is preferably about 1 to 1.2 µm.

External Electrode 4

A conductive material contained in the external electrode 4 is not limited, but low-cost Ni, Cu, or an alloy of these can be employed in the present invention. A thickness of the external electrode 4 should be appropriately determined according to application or so, but is normally preferably about 10 to 50 μm.

Method of Manufacturing Multilayer Ceramic Capacitor 1

The multilayer ceramic capacitor 1 of the present embodiment is manufactured similarly to conventional multilayer ceramic capacitors by preparing a green chip with an ordinary printing method or sheet method using a paste, firing this, and then firing this after external electrodes are printed or transferred thereon. This manufacturing method will be described specifically below.

First, a dielectric raw material (mixed raw material powder) contained in a dielectric layer-dedicated paste is prepared, and this is made into a coating to prepare the dielectric layer-dedicated paste.

First, a raw material of barium titanate and a raw material of rare earth compound are prepared as dielectric raw materials. As these raw materials, oxides of the above-described compositions or mixtures and composite oxides thereof can be employed, but a mixture of various compounds appropriately selected from, for example, carbonates, oxalates, nitrates, hydroxides, organic metallic compounds and the like, which become the above-described oxides or composite oxides after firing, can be also employed.

It is possible to employ a barium titanate raw material manufactured by a variety of methods, such as liquid phase methods (e.g., oxalate method, hydrothermal method, alkoxide method, sol-gel method etc.), in addition to a so-called solid phase method.

A BET specific surface area value of the barium titanate raw material powder is preferably 2.0 to 5.0 $m^2/g$, and is more preferably 2.5 to 3.5 $m^2/g$. With a BET specific surface area value within the above range, it becomes easy to favorably control an average thickness and a thickness variation σ of the grain boundary phases 20. The larger a BET specific surface area value is, the larger an average thickness of the grain boundary phases 20 tends to be and the smaller a thickness variation σ of the grain boundary phases 20 tends to be.

The surface of the raw material powder of barium titanate may be coated with at least the raw material powder of rare earth compound. This coating method is not limited, and a well-known method is employed. For example, the coating may be performed by turning the raw material powder of rare earth compound into a solution and thermally processing this solution. The surface of the raw material powder of barium titanate may be coated with a raw material powder of another component.

The amount of each compound in the dielectric raw material should be appropriately determined such that an average thickness and a thickness variation σ of the grain boundary phases 20 mentioned above are obtained after firing. Incidentally, there is normally no change in composition of the dielectric ceramic composite between before and after firing.

Apart from a barium titanate powder, a barium compound powder (e.g., a barium oxide powder, or a powder to be barium oxide by firing) may be added to the above-described dielectric raw material. There is no limit for an addition amount of the barium compound powder, and the barium compound powder may not be added. When adding the barium compound powder, an addition amount thereof can be 0.20 to 1.50 mol parts in terms of BaO with respect to 100 mol parts of barium titanate, for example. Relative permittivity tends to be good by adding the barium compound. The larger an amount of the barium compound is, the smaller an average thickness of the grain boundary phases 20 tends to be and the smaller a thickness variation σ of the grain boundary phases 20 tends to be. The larger an amount of the barium compound is, the better electrostatic capacity temperature characteristics tend to be.

In the present embodiment, when using oxides of each element as raw material powders of the barium compound, calcium compound, and silicon compound, these powders may be prepared respectively in the form of BaO powder, CaO powder, and $SiO_2$ powder, or may be prepared in the form of a composite oxide (Ba, Ca) $SiO_3$ powder (BCG powder). Incidentally, there is no limit for the composition of (Ba, Ca) $SiO_3$, that is, a content ratio of Ba, Ca, and Si.

Now, d50 of the dielectric raw material is not limited, but is preferably 0.45 μm or less. When d50 of the dielectric raw material is 0.45 μm or less, it becomes easy to control d50 of the ceramic particles after firing to 0.47 μm or less. The larger d50 of the dielectric raw material is, the better relative permittivity tends to be. The smaller d50 of the dielectric raw material is, the better high-temperature load lifetime and electrostatic capacity temperature characteristics tend to be.

The dielectric layer-dedicated paste may be an organic-based coating made by kneading the dielectric raw material and an organic vehicle, or may be a water-based coating.

The organic vehicle is made by dissolving a binder in an organic solvent. The binder used for the organic vehicle is not limited, and should be appropriately selected from various ordinary binders such as ethyl cellulose and polyvinyl butyral. The organic solvent used is not limited either, and should be appropriately selected from various organic solvents, such as terpineol, butyl carbitol, aceton, and toluene, according to a method utilized, such as a printing method and sheet method.

When the dielectric layer-dedicated paste is configured as a water-based coating, the dielectric raw material and a water-based vehicle made by dissolving the likes of a water-soluble binder or dispersing agent in water are kneaded. The water-soluble binder employed in the water-based vehicle is not limited, and for example, polyvinyl alcohol, cellulose, a water-soluble acrylic resin and the like should be employed.

An internal electrode layer-dedicated paste is prepared by kneading the above-described organic vehicle and either a conductive material composed of the above-described various kinds of conductive metals and alloys or various kinds of oxides, organic metal compounds, resinates, and the like to be the above-described conductive material after firing. Further, a common material may be contained in the internal electrode layer-dedicated paste. The common material is not limited, but preferably has a composition similar to the main component.

An external electrode-dedicated paste is prepared similarly to the above-described internal electrode layer-dedicated paste.

The amount of the organic vehicle in each of the above-described pastes is not limited, and an ordinary amount (e.g., binder: about 1 to 5 wt %, solvent: about 10 to 50 wt %) is selected. If necessary, additives selected from various dispersing agents, plasticizing agents, dielectrics, insulators, and so on may be contained in each paste. The total amount of these additives is preferably 10 wt % or less.

When a printing method is employed, the dielectric layer-dedicated paste and the internal electrode layer-dedicated paste are printed on a substrate of PET or the like, laminated, and cut in a predetermined shape, after which the cut portions are peeled off from the substrate to obtain green chips.

When a sheet method is employed, a green sheet is formed using the dielectric layer-dedicated paste, the internal electrode layer-dedicated paste is printed and an internal electrode pattern is formed on this green sheet, after which these are laminated to obtain a green chip.

Debinding treatment is performed on the green chip before firing. As debinding conditions, a temperature increase rate is preferably 5 to 300° C./hour, a holding temperature is preferably 180 to 400° C., and a temperature holding time is preferably 0.5 to 24 hours. A debinding atmosphere is air or a reducing atmosphere. The higher a holding temperature during debinding is and the longer a holding time during debinding is, the larger an average thickness of the grain boundary phases 20 tends to be and the smaller a thickness variation σ of the grain boundary phases 20 tends to be.

In firing of the green chip, a temperature increase rate is preferably 200 to 600° C./hour, and is more preferably 200 to 500° C./hour. With such a temperature increase rate, it becomes easy to favorably control an average thickness of the grain boundary phases 20 and a thickness variation σ thereof. The larger a temperature increase rate is, the smaller an average thickness of the grain boundary phases 20 tends to be and the smaller a thickness variation σ of the grain boundary phases 20 tends to be.

A holding temperature during firing is preferably 1200 to 1350° C. and is more preferably 1220 to 1300° C., and its holding time is preferably 0.5 to 8 hours and is more preferably 2 to 3 hours. When a holding temperature is 1200° C. or higher, the dielectric ceramic composite becomes easy to be sufficiently densified. When a holding temperature is 1350° C. or lower, it becomes easy to prevent a break of an electrode due to abnormal sintering of the internal electrode layer, deterioration of capacity temperature characteristics due to diffusion of an internal electrode layer constituent material, reduction of the dielectric ceramic composition, and the like. The higher a holding temperature is and the longer a holding time is, the larger an average thickness of the grain boundary phases 20 tends to be and the larger a thickness variation σ of the grain boundary phases 20 tends to be.

A firing atmosphere is preferably a reducing atmosphere, and a humidified mixed gas of $N_2$ and $H_2$ can be employed as an atmospheric gas, for example.

An oxygen partial pressure during firing should be appropriately determined according to a kind of conductive material in the internal electrode layer-dedicated paste, but when a base metal of the likes of Ni or an Ni alloy is employed as the conductive material, an oxygen partial pressure in the firing atmosphere is preferably $10^{-14}$ to $10^{-10}$ MPa. When an oxygen partial pressure is $10^{-14}$ MPa or higher, it becomes easy to prevent the conductive material of the internal electrode layer from causing abnormal sintering, and it becomes easy to prevent the internal electrode layer from suffering a break. When an oxygen partial pressure is $10^{-10}$ MPa or lower, it becomes easy to prevent oxidation of the internal electrode layer. A temperature decrease rate is preferably 50 to 500° C./hour. The higher an oxygen partial pressure is, the smaller an average thickness of the grain boundary phases 20 tends to be and the smaller a thickness variation σ of the grain boundary phases 20 tends to be.

After undergoing firing in a reducing atmosphere, the capacitor element body preferably undergoes annealing. The annealing is a treatment for reoxidizing the dielectric layer, which can significantly increase high-temperature load lifetime and thus improve reliability.

An oxygen partial pressure in an annealing atmosphere is preferably $10^{-9}$ to $10^{-5}$ MPa. When an oxygen partial pressure is $10^{-9}$ MPa or higher, it becomes easy to efficiently perform reoxidation of the dielectric layer. When an oxygen partial pressure is $10^{-5}$ MPa or lower, it becomes easy to prevent oxidation of the internal electrode layer. The higher an oxygen partial pressure is, the smaller an average thickness of the grain boundary phases 20 tends to be and the smaller a thickness variation σ of the grain boundary phases 20 tends to be.

A holding temperature during annealing is preferably 950 to 1150° C. When a holding temperature is 950° C. or higher, the dielectric layer becomes easy to be sufficiently oxidized, and insulation resistance (IR) and IR lifetime become easy to improve. On the other hand, when a holding temperature is 1150° C. or lower, it becomes easy to prevent oxidation of the internal electrode layer and a reaction between the internal electrode layer and a dielectric base. As a result, it becomes easy to improve electrostatic capacity, electrostatic capacity temperature characteristics, IR, and IR lifetime. Incidentally, the annealing may consist of only a temperature increase process and a temperature decrease process. That is, temperature holding time may be zero. In this case, holding temperature is identical to maximum temperature.

Regarding annealing conditions other than these, a temperature holding time is preferably 0 to 20 hours and is more preferably 2 to 4 hours, and a temperature decrease rate is preferably set to 50 to 500° C./hour and is more preferably set to 100 to 300° C./hour. For example, humidified $N_2$ gas or so is preferably employed as an atmospheric gas of the annealing. The higher an annealing temperature is and the longer an annealing time is, the larger an average thickness of the grain boundary phases 20 tends to be and the larger a thickness variation σ of the grain boundary phases 20 tends to be.

For example, a wetter or so is used for humidifying $N_2$ gas or mixed gas or so in the above-described debinding treatment, firing, and annealing. In this case, a water temperature is preferably about 5 to 75° C.

The debinding treatment, firing, and annealing may be performed in succession, or may be performed independently.

The capacitor element body obtained as described above undergoes end surface polishing by barrel polishing, sand blasting, or the like, for example, is coated with the external electrode-dedicated paste and then fired to form the external electrode 4. If necessary, a covering layer is formed on the surface of the external electrode 4 by plating or so.

The multilayer ceramic capacitor of the present embodiment thus manufactured is mounted, for example, on a printed board by solder or so, and is used in various kinds of electronic apparatuses, and so on.

The embodiments of the present invention have been described. The present invention is not limited to the above-mentioned embodiments, and may be variously modified within a scope not deviating from the purpose of the present invention.

In the above-mentioned embodiments, a multilayer ceramic capacitor was exemplified as the ceramic electronic component according to the present invention, but the ceramic electronic component according to the present invention is not limited to a multilayer ceramic capacitor, and may be any ceramic electronic component having dielectric layers and electrode layers. For example, a singleplate ceramic capacitor, a piezoelectric actuator, a ferroelectric memory, and so on, may be cited.

EXAMPLES

The present invention will be described below based on more detailed examples, but is not limited thereto.

Example 1

First, a barium titanate powder was prepared. The barium titanate powder expressed by a composition formula of $Ba_nTiO_{2+n}$ was employed, where "n" satisfies $0.995 \le n \le 1.010$, and the mole ratio of Ba and Ti satisfies $0.995 \le Ba/Ti \le 1.010$. Hereafter, the composition formula of barium titanate will be described simply as $BaTiO_3$. Furthermore, a $Y_2O_3$ powder as a yttrium raw material, a $Dy_2O_3$ powder as a dysprosium raw material, a $Ho_2O_3$ powder as a holmium raw material, a $MgCO_3$ powder as a magnesium raw material, a $Cr_2O_3$ powder as a chromium raw material, a MnO powder as a manganese raw material, a $V_2O_5$ powder as a vanadium raw material, BaO as a barium raw material, CaO as a calcium raw material, and $SiO_2$ as a silicon raw material were prepared respectively.

Next, each of the prepared raw material powders was wet-blended and pulverized for 10 hours by a ball mill, and then dried to obtain a mixed raw material powder. A grain diameter of the raw material powder was assumed to be a material grain diameter, and d50 of the material grain diameter was configured to be 0.40 µm.

Next, 100 weight parts of the obtained mixed raw material powder, 10 weight parts of a polyvinyl butyral resin, 5 weight parts of dioctyl phthalate (DOP) as a plasticizing agent, and 100 weight parts of an alcohol as a solvent were blended by a ball mill to form a paste, thereby obtaining a dielectric layer-dedicated paste.

Apart from the above, 44.6 weight parts of Ni grains, 52 weight parts of terpineol, 3 weight parts of ethyl cellulose, and 0.4 weight parts of benzotriazole were kneaded by a triple roll milling machine to form a slurry, whereby an internal electrode layer-dedicated paste was prepared.

Then, a green sheet was formed on a PET film to have a thickness of 4.5 µm after being dried using the dielectric layer-dedicated paste produced as above. Next, an electrode layer was printed with a predetermined pattern on this green sheet using the internal electrode layer-dedicated paste, and then the sheet was peeled from the PET film, whereby a green sheet having the electrode layer was prepared. Next, a plurality of the green sheets having electrode layers was laminated and pressure-bonded to be made into a green laminated body, and this green laminated body was cut into a predetermined size, whereby a green chip was obtained.

Next, the obtained green chip underwent debinding treatment, firing, and annealing under the following conditions to obtain a multilayer ceramic fired body.

As debinding treatment conditions, temperature increase rate was 25° C./hour, holding temperature was 260° C., temperature holding time was 8 hours, and atmosphere was in the air.

As firing conditions, temperature increase rate was 200° C./hour, holding temperature was 1200 to 1350° C., and holding time was 1 hour. Temperature decrease rate was 200° C./hour. Incidentally, atmospheric gas was a humidified $N_2+H_2$ mixed gas, and oxygen partial pressure was configured to be $10^{-12}$ MPa.

As annealing conditions, temperature increase rate was 200° C./hour, holding temperature was 1000° C., temperature holding time was 2 hours, temperature decrease rate was 200° C./hour, and atmospheric gas was humidified $N_2$ gas (oxygen partial pressure: $10^{-7}$ MPa).

Incidentally, a wetter was used to humidify the atmospheric gas during firing and annealing.

Next, an end surface of the obtained multilayer ceramic fired body was polished by sand blasting, then Cu was applied as an external electrode, and a sample of the multilayer ceramic capacitor shown in FIG. 1 was obtained. Size of the obtained capacitor sample was 3.2 mm×1.6 mm×0.6 mm. Thickness of the dielectric layer was 3.6 µm. Thickness of the internal electrode layer was 1.0 µm. The number of the dielectric layers sandwiched by the dielectric layers was four.

The obtained capacitor sample was subjected to measurement of d50 of the dielectric particles after firing, an average thickness of the grain boundary phases, a thickness variation σ of the grain boundary phases, high-temperature load lifetime HALT-η, and high-temperature load lifetime variation HALT-m by the following method.

d50 of Dielectric Particles after Firing

Samples whose chip side surfaces had been subjected to mirror polishing were observed by FE-SEM to obtain an image magnified by 30000 times, and d50 of the dielectric particles after firing was measured from an equivalent circle diameter of particles obtained from the image. Incidentally, the number of the sample particles was 500 to 2000.

Average Thickness and Thickness Variation σ of Grain Boundary Phases

STEM observation was performed on the cut surface of the dielectric layer of the capacitor sample. A STEM image was photographed so that one grain boundary phase measurable for thickness was included in a visual field of 15×15 nm. 10 STEM images were photographed at respectively different observation points per one sample. In each STEM image, thicknesses of the grain boundary phases were measured by visual observation and averaged to calculate an average thickness of the grain boundary phases. A standard deviation σ was calculated from the thicknesses of the grain boundary phases in the respective STEM images and was defined as a thickness variation σ of the grain boundary phases.

High-Temperature Load Lifetime HALT-η

In the present example, the capacitor sample was held in an application state of a DC voltage under an electric field of 25 V/µm at 200° C., and a time from the beginning of application to the drop of insulation resistance by one order was defined as a high-temperature load lifetime. In the present example, the above evaluation was conducted for 10 capacitor samples, and its average value was defined as a high-temperature load lifetime HALT-η. 10 hours or longer was considered to be good as evaluation standard. Results are shown in Table 1.

High-Temperature Load Lifetime Variation HALT-m

The measured results of high-temperature load lifetime were subjected to the Weibull plotting with respect to the 10 capacitor samples, and a "m" value was obtained by a Weibull analysis soft. In the present example, this "m" value was defined as a high-temperature load lifetime variation HALT-m. HALT-m of 3.0 or more was considered to be good. Results are shown in Table 1.

TABLE 1

| Sample No. | BaTiO3 (mol part) | CaO (mol part) | SiO2 (mol part) | Y2O3 (mol part) | Dy2O3 (mol part) | Ho2O3 (mol part) | MgO (mol part) | Cr2O3 (mol part) | MnO (mol part) |
|---|---|---|---|---|---|---|---|---|---|
| 1* | 100.00 | 0.80 | 3.00 | 1.00 | — | — | 2.00 | 0.20 | — |
| 2 | 100.00 | 0.80 | 2.50 | 1.00 | — | — | 2.00 | 0.20 | — |
| 3 | 100.00 | 0.80 | 3.00 | 1.50 | — | — | 2.00 | 0.20 | — |
| 4 | 100.00 | 0.80 | 2.50 | 1.50 | — | — | 2.00 | 0.20 | — |
| 5 | 100.00 | 0.80 | 1.65 | 1.30 | — | — | 2.00 | 0.20 | — |
| 6 | 100.00 | 0.80 | 2.50 | 1.50 | — | — | 2.00 | — | 0.20 |
| 7 | 100.00 | 0.80 | 2.50 | — | 1.50 | — | 2.00 | 0.20 | — |
| 8 | 100.00 | 0.80 | 2.50 | — | — | 1.50 | 2.00 | 0.20 | — |
| 9* | 100.00 | 0.80 | 2.00 | 2.00 | — | — | 2.00 | 0.20 | — |

| Sample No. | V2O5 (mol part) | R2O3/SiO2 | Ceramic particle grain diameter d50 (μm) | Average thickness (nm) | σ (nm) | HALT-η (hr) | HALT-m |
|---|---|---|---|---|---|---|---|
| 1* | 0.10 | 0.33 | 0.42 | 1.02 | 0.17 | 18.6 | 2.0 |
| 2 | 0.10 | 0.40 | 0.42 | 1.11 | 0.07 | 20.4 | 3.2 |
| 3 | 0.10 | 0.50 | 0.42 | 1.20 | 0.02 | 22.6 | 3.7 |
| 4 | 0.10 | 0.60 | 0.42 | 1.09 | 0.03 | 14.5 | 3.5 |
| 5 | 0.10 | 0.79 | 0.42 | 1.00 | 0.10 | 10.0 | 3.2 |
| 6 | 0.10 | 0.60 | 0.42 | 1.03 | 0.08 | 11.2 | 3.0 |
| 7 | 0.10 | 0.60 | 0.42 | 1.18 | 0.02 | 17.0 | 4.0 |
| 8 | 0.10 | 0.60 | 0.42 | 1.15 | 0.03 | 16.3 | 3.6 |
| 9* | 0.10 | 1.00 | 0.42 | 0.88 | 0.09 | 1.0 | 3.4 |

*Comparative Example

Furthermore, with respect to sample numbers 1, 5, and 9 in Table 1, HALT-η and HALT-m of samples whose average thickness and thickness variation of the grain boundary phases were changed by respectively changing test conditions were calculated. Results are shown in Table 2.

TABLE 2

| Sample No. | BaTiO3 (mol part) | CaO (mol part) | SiO2 (mol part) | Y2O3 (mol part) | MgO (mol part) | Cr2O3 (mol part) | V2O5 (mol part) | R2O3/SiO2 |
|---|---|---|---|---|---|---|---|---|
| 1* | 100.00 | 0.80 | 3.00 | 1.00 | 2.00 | 0.20 | 0.10 | 0.33 |
| 1a | 100.00 | 0.80 | 3.00 | 1.00 | 2.00 | 0.20 | 0.10 | 0.33 |
| 5 | 100.00 | 0.80 | 1.65 | 1.30 | 2.00 | 0.20 | 0.10 | 0.79 |
| 5a* | 100.00 | 0.80 | 1.65 | 1.30 | 2.00 | 0.20 | 0.10 | 0.79 |
| 5b* | 100.00 | 0.80 | 1.65 | 1.30 | 2.00 | 0.20 | 0.10 | 0.79 |
| 9* | 100.00 | 0.80 | 2.00 | 2.00 | 2.00 | 0.20 | 0.10 | 1.00 |
| 9a | 100.00 | 0.80 | 2.00 | 2.00 | 2.00 | 0.20 | 0.10 | 1.00 |

| Sample No. | Ceramic particle grain diameter d50 (μm) | Firing temperature (° C.) | Average thickness (nm) | σ (nm) | HALT-η (hr) | HALT-m |
|---|---|---|---|---|---|---|
| 1* | 0.42 | 1240 | 1.02 | 0.17 | 18.6 | 2.0 |
| 1a | 0.41 | 1220 | 1.01 | 0.08 | 10.5 | 3.1 |
| 5 | 0.42 | 1260 | 1.00 | 0.10 | 10.0 | 3.2 |
| 5a* | 0.44 | 1300 | 1.02 | 0.19 | 16.4 | 1.7 |
| 5b* | 0.41 | 1220 | 0.95 | 0.06 | 6.0 | 3.4 |
| 9* | 0.42 | 1280 | 0.88 | 0.09 | 1.0 | 3.4 |
| 9a | 0.45 | 1340 | 1.06 | 0.10 | 15.7 | 3.0 |

*Comparative Example

According to Table 1 and Table 2, sample numbers 1a, 2 to 8 (excluding 5a and 5b), and 9a, whose average thicknesses of the grain boundary phases were 1.0 nm or more and whose thickness variations σ of the grain boundary phases were 0.1 nm or less, indicated that HALT-η was 10 hours or longer and HALT-m was 3.0 or more regardless of kind and amount of elements contained. That is, these samples had a high high-temperature load lifetime and a small high-temperature load lifetime variation.

On the other hand, sample numbers 1 and 5a, whose thickness variations σ of the grain boundary phases were too large, indicated that HALT-m was small. That is, high-temperature load lifetime variations were large. Sample numbers 5b and 9, whose average thicknesses of the grain boundary phases were too small, indicated that HALT-η was small and that high-temperature load lifetime decreased significantly.

Incidentally, sample number 1a is a sample fabricated from sample number 1 by changing the firing temperature thereof (firing temperature: 1240° C.) to a firing temperature of 1220° C., sample number 5a is a sample fabricated from sample number 5 by changing the firing temperature thereof (firing temperature: 1260° C.) to a firing temperature of 1300° C., sample number 5b is a sample fabricated from sample number 5 by changing the firing temperature thereof (firing temperature: 1260° C.) to a firing temperature of 1220° C., and sample number 9a is a sample fabricated from sample number 9 by changing the firing temperature thereof (firing temperature: 1280° C.) to a firing temperature of 1340° C.

Example 2

Various characteristics of capacitor samples fabricated in the same manner as Example 1 except for changing an amount of each component were measured. Results are shown in Table 3. Capacitor samples were fabricated from sample number 13 in Table 3 by changing a material grain diameter d50 in a range of 0.25 to 0.45 nm, and various characteristics were measured. Results are shown in Table 4. All of the samples described in Table 3 and Table 4 indicated that an average thickness of the grain boundary phases was 1.0 nm or more, a thickness variation σ of the grain boundary phases was 0.1 nm or less, and further HALT-m was 3.0 or more. Hereinafter, each method of measuring relative permittivity μs and electrostatic capacity temperature characteristics TC will be described.

Relative Permittivity ∈s

Relative permittivity ∈s of the capacitor samples was measured using a LCR meter at a temperature of 20° C. and at a frequency of 1 kHz. Results are shown in Table 1. Incidentally, ∈s≥1900 was considered to be good in the present example.

Electrostatic Capacity Temperature Characteristics TC

Electrostatic capacity of the capacitor samples was measured using a thermostat and a LCR meter at temperatures of 25° C. and 125° C. Then, a change rate of electrostatic capacity at a temperature of 125° C. based on an electrostatic capacity at a temperature of 25° C. was calculated and defined as an electrostatic capacity temperature characteristic@125° C. Results are shown in Table 1. Incidentally, −15.0%≤TC@125° C.≤15.0% was considered to be good in the present example. It was confirmed that all capacitor samples satisfying −15.0%≤TC@125° C.≤15.0% satisfied X7R characteristics.

Evaluation

First, the problem of the present invention is not overcome by samples whose high-temperature load lifetime HALT-η was less than 10 hours. This case was considered as x regardless of results of relative permittivity and electrostatic capacity temperature characteristics. Next, when a high-temperature load lifetime was 10 hours or longer, ⊚ was defined as where both relative permittivity and electrostatic capacity temperature characteristics were good, ○ was defined as where either relative permittivity or electrostatic capacity temperature characteristics was good, and Δ was defined as where neither relative permittivity nor electrostatic capacity temperature characteristics was good (incidentally, Example 2 had no samples evaluated as Δ or x). Incidentally, ⊚, ○, Δ, and x are more valued in this order.

TABLE 3

| Sample No. | BaTiO3 (mol part) | BaO (mol part) | CaO (mol part) | SiO2 (mol part) | Y2O3 (mol part) | MgO (mol part) | Cr2O3 (mol part) | V2O5 (mol part) |
|---|---|---|---|---|---|---|---|---|
| 2 | 100.00 | 1.20 | 0.80 | 2.50 | 1.00 | 2.00 | 0.20 | 0.10 |
| 3 | 100.00 | 1.20 | 0.80 | 3.00 | 1.50 | 2.00 | 0.20 | 0.10 |
| 4 | 100.00 | 1.20 | 0.80 | 2.50 | 1.50 | 2.00 | 0.20 | 0.10 |
| 5 | 100.00 | 1.20 | 0.80 | 1.65 | 1.30 | 2.00 | 0.20 | 0.10 |
| 11 | 100.00 | 1.20 | 0.50 | 2.00 | 1.50 | 2.00 | 0.20 | 0.10 |
| 12 | 100.00 | 1.20 | 0.75 | 2.00 | 1.50 | 2.00 | 0.20 | 0.10 |
| 13 | 100.00 | 1.20 | 0.80 | 2.00 | 1.50 | 2.00 | 0.20 | 0.10 |
| 14 | 100.00 | 1.20 | 1.00 | 2.00 | 1.50 | 2.00 | 0.20 | 0.10 |
| 15 | 100.00 | 1.20 | 1.50 | 2.00 | 1.50 | 2.00 | 0.20 | 0.10 |
| 16 | 100.00 | 1.20 | 2.00 | 2.00 | 1.50 | 2.00 | 0.20 | 0.10 |
| 17 | 100.00 | 1.20 | 0.80 | 2.00 | 1.50 | 1.80 | 0.20 | 0.10 |
| 13 | 100.00 | 1.20 | 0.80 | 2.00 | 1.50 | 2.00 | 0.20 | 0.10 |
| 18 | 100.00 | 1.20 | 0.80 | 2.00 | 1.50 | 2.20 | 0.20 | 0.10 |
| 19 | 100.00 | 1.20 | 0.80 | 2.00 | 1.50 | 2.50 | 0.20 | 0.10 |
| 13 | 100.00 | 1.20 | 0.80 | 2.00 | 1.50 | 2.00 | 0.20 | 0.10 |
| 20 | 100.00 | 1.20 | 0.80 | 2.00 | 1.50 | 2.00 | 0.30 | 0.10 |
| 21 | 100.00 | 1.20 | 0.80 | 2.00 | 1.50 | 2.00 | 0.60 | 0.10 |
| 22 | 100.00 | 1.20 | 0.80 | 2.00 | 1.50 | 2.00 | 0.70 | 0.10 |
| 23 | 100.00 | 1.20 | 0.80 | 2.00 | 1.50 | 2.00 | 0.20 | 0.05 |
| 13 | 100.00 | 1.20 | 0.80 | 2.00 | 1.50 | 2.00 | 0.20 | 0.10 |
| 24 | 100.00 | 1.20 | 0.80 | 2.00 | 1.50 | 2.00 | 0.20 | 0.15 |
| 25 | 100.00 | 1.20 | 0.80 | 2.00 | 1.50 | 2.00 | 0.20 | 0.20 |
| 26 | 100.00 | 0.20 | 0.80 | 2.00 | 1.50 | 2.00 | 0.20 | 0.10 |
| 27 | 100.00 | 0.50 | 0.80 | 2.00 | 1.50 | 2.00 | 0.20 | 0.10 |
| 28 | 100.00 | 1.00 | 0.80 | 2.00 | 1.50 | 2.00 | 0.20 | 0.10 |
| 13 | 100.00 | 1.20 | 0.80 | 2.00 | 1.50 | 2.00 | 0.20 | 0.10 |
| 29 | 100.00 | 1.50 | 0.80 | 2.00 | 1.50 | 2.00 | 0.20 | 0.10 |

| Sample No. | Y2O3/SiO2 | Ceramic particle grain diameter d50 (μm) | HALT-η (hr) | ∈S | TC@125° C. (%) | Determination |
|---|---|---|---|---|---|---|
| 2 | 0.40 | 0.42 | 20.4 | 2160 | −14.9 | ⊚ |
| 3 | 0.50 | 0.42 | 22.6 | 1807 | −11.7 | ○ |
| 4 | 0.60 | 0.42 | 14.5 | 1918 | −10.1 | ⊚ |
| 5 | 0.79 | 0.42 | 10.0 | 2229 | −13.1 | ⊚ |
| 11 | 0.75 | 0.42 | 10.3 | 2109 | −8.2 | ⊚ |
| 12 | 0.75 | 0.42 | 12.2 | 2019 | −9.1 | ⊚ |
| 13 | 0.75 | 0.42 | 12.4 | 2011 | −9.4 | ⊚ |
| 14 | 0.75 | 0.42 | 14.0 | 2023 | −10.5 | ⊚ |
| 15 | 0.75 | 0.42 | 17.0 | 1946 | −11.7 | ⊚ |
| 16 | 0.75 | 0.42 | 18.1 | 2054 | −12.3 | ⊚ |
| 17 | 0.75 | 0.42 | 10.0 | 2066 | −9.6 | ⊚ |
| 13 | 0.75 | 0.42 | 12.4 | 2011 | −9.4 | ⊚ |

TABLE 3-continued

| | | | | | | |
|---|---|---|---|---|---|---|
| 18 | 0.75 | 0.42 | 14.1 | 2001 | −9.6 | ◉ |
| 19 | 0.75 | 0.42 | 15.0 | 1881 | −9.7 | ○ |
| 13 | 0.75 | 0.42 | 12.4 | 2011 | −9.4 | ◉ |
| 20 | 0.75 | 0.42 | 14.3 | 2041 | −9.8 | ◉ |
| 21 | 0.75 | 0.42 | 15.5 | 2001 | −11.4 | ◉ |
| 22 | 0.75 | 0.42 | 15.8 | 1980 | −11.8 | ◉ |
| 23 | 0.75 | 0.42 | 11.3 | 2197 | −14.5 | ◉ |
| 13 | 0.75 | 0.42 | 12.4 | 2011 | −9.4 | ◉ |
| 24 | 0.75 | 0.42 | 14.0 | 2006 | −7.5 | ◉ |
| 25 | 0.75 | 0.42 | 20.1 | 1876 | −6.1 | ○ |
| 26 | 0.75 | 0.42 | 19.0 | 1898 | −12.2 | ○ |
| 27 | 0.75 | 0.42 | 17.2 | 1946 | −11.6 | ◉ |
| 28 | 0.75 | 0.42 | 14.1 | 2023 | −10.7 | ◉ |
| 13 | 0.75 | 0.42 | 12.4 | 2011 | −9.4 | ◉ |
| 29 | 0.75 | 0.42 | 10.4 | 2004 | −8.0 | ◉ |

TABLE 4

| Sample No. | Material grain diameter d50 | Ceramic particle grain diameter d50 | HALT-η (hr) | εS | TC@125° C. | Determination |
|---|---|---|---|---|---|---|
| 31 | 0.25 | 0.26 | 21.2 | 1559 | −6.9 | ○ |
| 32 | 0.30 | 0.32 | 19.1 | 1702 | −8.2 | ○ |
| 33 | 0.35 | 0.37 | 16.8 | 1769 | −8.8 | ○ |
| 13 | 0.40 | 0.42 | 12.4 | 2011 | −9.4 | ◉ |
| 34 | 0.45 | 0.47 | 10.2 | 2110 | −10.4 | ◉ |

Table 3 and Table 4 show that relative permittivity and electrostatic capacity temperature characteristics can be favorably controlled in addition to high-temperature load lifetime by controlling composition of dielectric composite and grain diameter of dielectric particles.

NUMERICAL REFERENCES

1 . . . multilayer ceramic capacitor
2 . . . dielectric layer
3 . . . internal electrode layer
4 . . . external electrode
10 . . . capacitor element body
12, 12' . . . ceramic particle
20 . . . grain boundary phase

The invention claimed is:

1. A ceramic electronic component comprising a dielectric layer and an electrode layer, wherein
the dielectric layer contains a plurality of ceramic particles and grain boundary phases present therebetween,
a main component of the ceramic particles is barium titanate,
an average thickness of the grain boundary phases is 1.0 nm or more, and
a thickness variation σ of the grain boundary phases is 0.1 nm or less.

2. The ceramic electronic component according to claim 1, wherein
the dielectric layer contains barium titanate, yttrium, magnesium, chromium, vanadium, calcium, and silicon and
an amount of the yttrium is 1.0 to 1.5 mol parts in terms of $Y_2O_3$, an amount of the magnesium is 1.8 to 2.5 mol parts in terms of MgO, an amount of the chromium is 0.2 to 0.7 mol parts in terms of $Cr_2O_3$, an amount of the vanadium is 0.05 to 0.2 mol parts in terms of $V_2O_5$, an amount of the calcium is 0.5 to 2.0 mol parts in terms of CaO, and an amount of the silicon is 1.65 to 3.0 mol parts in terms of $SiO_2$, provided that an amount of the barium titanate is 100 mol parts in terms of $BaTiO_3$.

3. The ceramic electronic component according to claim 1, wherein
d50 of the ceramic particles is 0.47 μm or less.

4. The ceramic electronic component according to claim 2, wherein
d50 of the ceramic particles is 0.47 μm or less.

5. The ceramic electronic component according to claim 1, wherein
the dielectric layer contains a rare earth element "R" and silicon and
a value of an amount of the "R" in terms of $R_2O_3$ divided by an amount of the silicon in terms of $SiO_2$ is 0.40 or more and 0.79 or less.

6. The ceramic electronic component according to claim 2, wherein
the dielectric layer contains a rare earth element "R" and silicon and
a value of an amount of the "R" in terms of $R_2O_3$ divided by an amount of the silicon in terms of $SiO_2$ is 0.40 or more and 0.79 or less.

7. The ceramic electronic component according to claim 3, wherein
the dielectric layer contains a rare earth element "R" and silicon and
a value of an amount of the "R" in terms of $R_2O_3$ divided by an amount of the silicon in terms of $SiO_2$ is 0.40 or more and 0.79 or less.

8. The ceramic electronic component according to claim 4, wherein
the dielectric layer contains a rare earth element "R" and silicon and
a value of an amount of the "R" in terms of $R_2O_3$ divided by an amount of the silicon in terms of $SiO_2$ is 0.40 or more and 0.79 or less.

* * * * *